Patented Sept. 15, 1931

1,823,216

UNITED STATES PATENT OFFICE

DAVID F. SMITH, OF PITTSBURGH, PENNSYLVANIA

ANTIFREEZE COMPOSITION

No Drawing.   Application filed July 10, 1928.   Serial No. 291,693.

This invention relates to antifreeze compositions and solutions and particularly to such compositions and solutions as are substantially non-corrosive.

The materials heretofore suggested in the prior art for such usage possess a number of disadvantages among which the following may be noted: (1) increase of temperature results in loss of material by the latter being driven off; (2) the boiling point of the solution is or may become so high as to cause damage; (3) the viscosity of the solution is much greater than the viscosity of pure water; (4) many "organic" materials if properly purified, do not result in any greater corrosive effects than does pure water, but neither do they reduce corrosion; (5) the cost of "organic" freezing-point depressants is high and becomes still higher when sufficient purification of the materials is made; and (6) many "organic" materials undergo decomposition after continued heating resulting in "gummy" and corrosive products. Although several cheap non-corrosive antifreeze mixtures have been suggested, they have involved "inorganic" materials which, while purporting to prevent corrosion, have not accomplished this end, which fact is attested by the fact that none of these proposed mixtures has come into general use despite their cheapness or low cost, and further despite the fact that there is a real and obvious need for such compositions.

Among the objects and advantages of the present invention is the production of non-corrosive antifreeze mixtures, compositions and solutions that are relatively inexpensive, are substantially free from corrosive action, and in general do not exhibit the disadvantages of the prior art materials.

Other and further objects and advantages will appear from the more detailed description given below, but it will be understood that this more detailed description is given by way of illustration and not by way of limitation, since various changes may be made therein by those skilled in the art without departing from the spirit and scope of this invention.

This invention involves three fundamental principles which have not heretofore been applied for the purpose in mind, namely: first, the proper selection of a freezing-point depressant; second, the control of the acidity (or alkalinity) of the composition or solution so as to protect against corrosion of any metals with which the solution comes into contact; and third, the inclusion of protecting or passifying agents which specifically prevent the corrosion of certain metals. The application of these principles to the solution of the problem in hand is illustrated below.

Whereas it has been long known that certain relatively cheap "inorganic" materials depress the freezing point of water to a considerable extent, it has not been recognized just what the characteristics are, of the most efficient of such materials. It has been known that, for a given substance, the higher the concentration of material dissolved in water, the lower the freezing point of the solution. Thus, the extent of solubility of a substance has been taken as a measure of its value as a desired freezing point depressant. This is a necessary, but not a sufficient criterion for the selection of a material for use in this connection. On the other hand it has been discovered that certain materials are characterized by the property that the lowering of the freezing-point of the solution per unit weight of material increases very rapidly as the solution becomes more concentrated.

Thus it is possible to obtain a given freezing-point lowering with a much smaller amount of material of this nature than is possible for materials in general which show the opposite effect, namely, each successive addition of a unit weight of material gives a smaller lowering of the freezing point than the preceding. Thus, unless the proper material is selected, prohibitively high concentrations of freezing-point depressant are necessary to afford sufficient protection against freezing. It has also been discovered that, in many cases, for a given weight of material, the larger freezing-point depression is obtained with the material having the lower molecular weight. Other things being equal then, it has been found desirable to use a freezing point depressant of lower molecular weight.

It has also been discovered that the corrosive properties of a solution depend largely upon the nature of the freezing-point depressant used. Thus, a freezing-point depressant consisting of an alkaline earth nitrate or an alkaline earth acetate does not destroy certain protective coatings on iron, and thus does not corrode iron when in the presence of material which forms such protective coating, while a freezing-point depressant consisting of an alkaline earth chloride dissolves certain protective coatings and thus corrodes the iron. It is thus possible in accordance with the present invention, to select the proper freezing-point depressant which, with suitable additions of small quantities of other materials (whose quantity and nature depend upon the character of the freezing point depressant used and upon the nature of the corrosion prevention needed), results in a solution which will not only eliminate excessive corrosion, but actually will cause less corrosion than results in use of ordinary city water.

It has further been discovered that control of the acidity or alkalinity of a solution is necessary in order to prevent corrosion of any metal. This results first, from the fact that the ability of oxygen of the air to attack metals (that is, the ability to initiate rust formation) is very much less in alkaline solutions and, second, that the formation and retention of protective films on metal surfaces often depends upon the alkalinity of the solution. The desired degree of alkalinity in the solution may be obtained either by adding an appropriate amount of caustic alkali or other alkali or of a compound of a strong base and a weak acid, which results in an alkaline reaction. By the addition of a material of this type, such materials being hereinafter referred to as a "buffer compound" or a "buffer salt", the proper alkalinity may be controlled both during preparation of the solution and during use of it. In the case of solutions which are subject to changes of temperature as heating (as for example in the cooling jackets of internal combustion engines), when a "buffer" salt is used—that is the salt of a strong base and a weak acid—when the acid is volatile, the heating causes the volatile acid to be driven off from the solution in proportion to the accumulation of extraneous acid. This effect results in maintaining a given alkalinity in the solution in spite of any possible accumulation of extraneous acid. In some instances, it may be preferred to keep in contact with the solution, a small amount of a solid material whose solubility is such as always to maintain the proper alkalinity in the solution. In some cases, a "buffer" salt may be used which also acts as a freezing point depressant, so that protection against freezing and proper control of alkalinity are obtained with the same material.

Further, it has been discovered that in addition to the proper selection of material to be used as a freezing-point depressant and to the proper control of alkalinity, it is usually advisable to add a small amount of a material which passivifies or forms a protective coating on iron or other base metal with which the solution comes into contact. Such materials are hereinafter referred to as "protectants". Such passivifying material may be a material which forms an adherent, protective coating of oxide or which causes the metal to assume that condition known as "a passive condition". In this case an oxidizing agent such as a chromate, permanganate, nitrate or other suitable oxidizing agent may be used. The protecting material may also be of a character which forms an insoluble compound which adheres to the surface of the metal. For this purpose there may be used such compounds as a cyanide, carbonate, phosphate, silicate, or arsenate. Further there may be used for securing effects of this character, a noble metal such as copper which, upon contact with a base metal such as iron, is deposited out on the iron and forms a protective coating preventing further dissolving of the iron. That is, the salt of the metal chosen should be a metal that stands lower in the electromotive series than the metal of the surface with which the solution comes into contact. In some cases there may be kept in contact with the solution, a small amount of a solid material whose solubility is such as always to maintain the proper concentration of protectant in the solution.

In certain cases, it is possible to combine in a single compound all three features of depressant, buffer, and protectant. Magnesium chromate is an example of such a compound. But some otherwise satisfactory materials are of no practical interest in this connection due to cost.

As examples of suitable freezing-point depressants having the above described properties, the following may be mentioned: calcium chloride, magnesium nitrate, magnesium acetate, magnesium chloride, magnesium chromate. In general, freezing point depressants are not desirably used without the addition of material to protect against corrosion. To protect against corrosion, there may be added a small amount of alkali and a small amount of a soluble chromate or permanganate. Or, there may be added to one of these freezing point depressants, a minor amount of the salt of a strong base and a weak acid in addition to a minor amount of a soluble chromate or permanganate.

It has been found, when adding to the major freezing-point depressant, materials to control alkalinity and to cause passivification or form protective coatings, that it is desirable (especially when these minor constituents must be added in considerable amount) to choose such materials as will also largely contribute to the depression of the freezing point and will not, by chemical interaction with other materials present, form compounds which are not good freezing point depressants. As an example of the proper choice of materials, there has been used a solution of a mixture of the following materials: magnesium chloride (major freezing point depressant), magnesium acetate ("buffer" salt), magnesium chromate (protecting material). It has also been found valuable in some cases to utilize the control of alkalinity and the presence of passivifying or protecting materials in connection with an "organic" freezing point depressant in order to prevent corrosion.

It has also been found that materials to be used in a mixture having the desirable characteristics herein described for a non-corrosive antifreezing solution, must be properly chosen so that interaction between them does not result in the formation of a compound which is insoluble or which, in case the solution is subjected to heating, may become insoluble when hot. For example, the amount of chromate which can be safely added to a solution containing calcium chloride as a freezing point depressant is much less than that which can be added to a solution containing magnesium chloride as a freezing point depressant.

As specific examples of mixtures which will depress the freezing point to from 0° to 10° below zero Fahrenheit and which have proved upon actual use to show less corrosion than when ordinary city water alone is used, the following are given:

A. 7 pounds of calcium chloride ($CaCl_2 \cdot H_2O$), ½ pound sodium chromate ($Na_2CrO_4$), and 0.03 pound sodium hydroxide ($NaOH$) added to enough water to make a total volume of 4 gallons.

B. 9½ pounds magnesium acetate $$(Mg(C_2H_3O_2)_2),$$

¼ pound sodium chromate and 0.08 pound caustic soda added to enough water to make a total volume of 4 gallons.

C. 6 pounds magnesium chloride ($MgCl_2$), 1 pound magnesium acetate, and ½ pound magnesium chromate ($MgCrO_4$) added to enough water to make a total volume of 4 gallons.

The non-corrosive antifreezing solutions, mixtures, and compositions prepared in accordance with this disclosure may be utilized in refrigerating systems, in the cooling jackets of internal combustion engines in winter, and in general may be used wherever the desirability of such solutions and compositions has heretofore been found advantageous.

Having thus set forth my invention, I claim:

1. An antifreeze composition comprising magnesium chloride, magnesium acetate and magnesium chromate.

2. A composition for the purpose specified, comprising an acetate of alkaline earth metal, a soluble chromate and a chloride of an alkaline metal.

3. A composition for the purpose specified, comprising a chloride, acetate, and a chromate of an alkaline earth metal.

In testimony whereof I affix my signature.

DAVID F. SMITH.